United States Patent Office 3,037,881
Patented June 5, 1962

3,037,881
AQUEOUS DISPERSION PAINT COMPOSITIONS
Maurice J. McDowell, Haddonfield, N.J., assignor to E. I. du Pont de Nemours and Company, Wilmington, Del., a corporation of Delaware
No Drawing. Filed July 21, 1958, Ser. No. 749,588
24 Claims. (Cl. 117—72)

This invention relates to aqueous dispersion organic polymer compositions and to a method of preparing the same. More particularly the invention relates to aqueous dispersion polymer polyblends of an elastomeric hydrocarbon polymer of a $C_4$ monoolefin and an ester polymer in which pigments have been dispersed to particularly adapt the aqueous dispersion composition for utility as weather-resistant water vapor permeable exterior house paint.

Latex paints are well known in the coating art and numerous patents relate to formulation of water-dilutable latex paints from aqueous dispersions of organic polymers such as polyvinyl acetate, polystyrene, butadiene/styrene copolymers, acrylic and methacrylic ester homopolymers and copolymers thereof, and vinylidene polymers. While these aqueous dispersion paints have found wide use as an interior house paint and in some instances as an exterior masonry paint, these products nevertheless exhibit undesirable deficiencies and disadvantages, particularly when applied to wood siding and trim as an exterior house paint.

Ordinarily these commonly used polymers and copolymers are moderately hard and require plasticization for coating purposes. Plasticizers ordinarily used are liquid, non-volatile, non-polymerizable monomeric materials, preferably a solvent for the polymer. Such plasticizers generally exhibit the characteristic of being migratory from the plasticized polymer composition. Hence on aging, the plasticized polymer coating deteriorates in plastic properties.

Exterior house paints are subjected to a wide fluctuation in atmospheric temperature conditions, such as the exposure to the frigid northern climate winters and the exposure to the hot southern climate summers or to even the hot desert exposure. An adequate house paint composition in addition to the ordinary requirements pertinent to durability must be sufficiently plastic when applied at ordinary protective paint film thickness to resist cold cracking during winter exposure and must not be too thermoplastic during hot summer exposure. The aforementioned latex paint polymers plasticized with ordinary plasticizers to adequately resist frigid exposure are soft and tacky on hot summer exposure resulting in disfigurement by collection of embedded air-borne dirt which is not removable by washing.

The primary object of this invention is to provide an aqueous dispersion organic polymer polyblend coating composition, adapted for exterior house paint use, which on drying by volatile loss of the volatile aqueous diluents therefrom deposits a durable weather-resistant, water vapor permeable, coalesced continuous paint film which is adequately thermoplastic and flexible to resist ordinary climatic temperature variations without exhibition of the aforementioned deficiencies. Another important object is to provide an aqueous paint composition which in addition to the already discussed performance properties is characterized by stability in its aqueous liquid dispersed state, that is, the polymer dispersion is stable toward mixing and mechanical working or grinding during pigmentation, retains its desirable rheological properties during prolonged storage in its package and is tolerant to freeze-thawing. Still other important objects will become apparent from the description of the invention.

These objects are accomplished by preparing an aqueous dispersion paint vehicle by mixing a stable aqueous dispersion of colloidal particles of a solid elastomeric polymer of at least one $C_4$ monoolefinic hydrocarbon, preferably a substantially saturated copolymer of the $C_4$ monoolefinic hydrocarbon and a $C_4$-$C_8$ diolefin hydrocarbon, with an aqueous dispersion of colloidal particles of at least one organic ester polymer comprising essentially polymerizably combined units derived from a polymerizable monomeric ester having a $>C=CH_2$ vinylidene moiety, preferably a copolymer of at least one ester of an alpha, beta-unsaturated vinylidene monocarboxylic acid, the proportions of the elastomeric hydrocarbon polymer I in the polymer polyblend being from 95% to 35% by weight and the modifying ester polymer II being correspondingly from 5% to 65%. Paint is prepared by dispersing a paint pigment composition comprising at least one hiding prime paint pigment in the aqueous polymer polyblend paint vehicle, preferably in an advantageous amount corresponding to a pigment volume concentration of 25% to 65%.

Pigment volume concentration as used throughout the specification and claims is defined as the ratio expressed on a percentage basis of the volume of the pigment composition relative to the total volume of the non-volatile film-forming components of the paint vehicle and the volume of the pigment composition.

The elastomeric hydrocarbon polymer can be a homopolymer of an $C_4$ moolefinic hydrocarbon, namely isobutylene, 1-butene, 2-butene or mixtures thereof. Preferred elastomeric hydrocarbon polymers are copolymers of the $C_4$ monoolefinic hydrocarbon, especially isobutylene, and a $C_4$ to $C_8$ diolefinic hydrocarbon such as isoprene, butadiene, pentadiene, hexadiene, heptadiene and octadiene. Isoprene is particularly preferred as the diene component of the elastomeric hydrocarbon copolymer. These useful hydrocarbon copolymers are substantially saturated and can have a degree of residual ethylenic unsaturation up to 2.5 mol percent expressed as isoprene or equivalently that corresponding to the unsaturation of a copolymer of 95 mol percent isobutylene and 5 mol percent of isoprene. A copolymer of 0.5 to 3 mol percent of isoprene and 99.5 to 97 mol percent isobutylene represents the preferred range of residual ethylenic unsaturation.

Copolymers of isobutylene and isoprene, ordinarily designated as butyl rubber, having about 1.5 to 2.5 mol percent of copolymerized units of isoprene are particularly preferred as the elastomeric hydrocarbon polymer.

These elastomeric hydrocarbon polymers are solid polymers substantially high in molecular weight and are ordinarily characterized by a Mooney viscosity in the range of about 40 to about 80 measured at 212° F. This viscosity method is also referred to as "Viscosity of Rubber by the Shearing Disc Viscometer," ASTM Designation D-927 55T. The viscometer is also described in Industrial and Engineering Chemistry, Analytical Edition, volume 6, No. 2, March 1934, page 147.

These elastomeric hydrocarbon polymers, particularly butyl rubber and polyisobutylene are commercially available. Aqueous dispersions of these elastomeric polymers having a colloidal particle diameter from about 0.05 to 5 microns ordinarily are prepared by post-dispersion of the solid polymer in an aqueous medium containing an organic surfactant in a dispersion stabilizing amount rather than by aqueous emulsion polymerization techniques. Aqueous dispersions of butyl rubber are commercially available. Typical products are Butyl Rubber Latex MD–600–34 and Butyl Rubber Latex MD–600–55 supplied by Enjay Company, Inc. These are post-dispersions of Enjay Butyl 268, butyl rubber, Mooney viscosity of at least 70, respectively at about 34% and about 55% by weight of solids in water, each further containing about 6% by weight of an anionic surfactant based on the dispersion solids. This butyl rubber is also identifiable as GRI–18, a copolymer of isobutylene having 1.5 to 2% of unsaturation expressed as isoprene. The dispersed butyl rubber particles have an average particle-size (diameter) of about 0.5 micron, the ordinary range of particle diameter being about 0.05 to 1 micron.

The stabilizing surfactant for the hydrocarbon polymer dispersion preferably is a water-soluble alkali metal salt of a sulfuric acid ester of an alkylphenoxy polyethanoxyethanol. The alkyl substituent can have from 7 to 18 carbon atoms, the number of ethanoxy groups usually being from 3 to 10.

The Butyl Rubber Latex MD–600–55 is further characterized by a specific gravity of .96 and a pH of 5 to 6. The viscosity of the dispersion as measured with the Brookfield viscosimeter at 70° F. using Spindle #1 is 15 to 16 poises at 6 r.p.m., 9 to 10 poises at 12 r.p.m., 4 to 5 poises at 30 r.p.m. and about 3 poises at 60 r.p.m.

If it is desirable to initiate with butyl rubber or other useful elastomeric hydrocarbon polymers rather than with purchased latex or aqueous dispersion of the elastomeric polymer derived from the polymerizable $C_4$ monoolefinic hydrocarbons, these polymers can be post-dispersed by the following typical technique to provide a useful aqueous dispersion.

Butyl rubber is dissolved in a water-immiscible volatile organic solvent therefor such as for example toluene, benzene or gasolene-type aliphatic hydrocarbon, in an amount to provide a 25% by weight solution of the elastomeric hydrocarbon polymer. If desired, the mixture can be heated to accelerate the rate of solution. Surfactant "Triton" 770, sodium salt of sulfuric acid ester of t.-octyl-phenoxy-polyethanoxy-ethanol, is added to the solution in an amount corresponding to 6% based on the weight of the polymer and rapidly mixed to uniformly distribute the surfactant. Water is added with continued rapid mixing in an amount sufficient to cause phase inversion, thereby forming an oil-in-water dispersion. This dispersion is diluted to about 10% by weight of the elastomeric polymer and is passed through a Charlotte high speed colloid mill having a 3 mil rotor clearance, maintaining the charge cool during the dispersion operation. The operation is continued until the particle-size of the dispersed polymer is less than 3 microns. The resulting dispersion is filtered through muslin and concentrated by stripping off the volatile organic solvent and part of the water. The concentrating step is preferably carried out under reduced pressure in a circulating evaporator. If desired, an anti-foam agent, such as for example, liquid polymethyl siloxanes, can be added in ordinary defoaming amounts to the dispersion prior or during the stripping operation. The dispersion is concentrated to a practical concentration in the range of about 30% to 55% by weight of the elastomeric polymer. The particle-size of the dispersed polymer in the resulting concentrate ordinarily is in the range of about 0.5 to 3 microns.

Although the described elastomeric hydrocarbon polymers exhibit excellent elasticity and flexibility and excellent resistance to exposure to climatic weather conditions which characteristics are pertinent to utilization of the hydrocarbon polymer as the film-forming vehicle of an exterior house paint, these elastomeric polymer paint vehicles having ordinary pigmentation characteristics of paint formulations are too soft and tacky for use as the sole film-forming component of an exterior house paint vehicle. These aqueous dispersion elastomeric hydrocarbon polymers mixed or blended with an aqueous dispersion of a characteristically harder ester polymer having combined units derived from a polymerizable monovinylidene-unsaturated ester, especially a copolymer of an ester of an alpha, beta-unsaturated vinylidene carboxylic acid provide an organic polymer polyblend which is improved in reference to the tackiness and softness which characterizes the elastomeric polymer without significantly altering the elastomeric and flexibility properties and the desirable weathering characteristics.

The modifying ester polymer can be present in the polymer polyblend in an amount as little as 5% and up to 65% by weight, the balance being the elastomeric hydrocarbon polymer. At least 5% of the ester polymer is required to show a significant and practical improvement toward less tack and less softness of the polyblend in comparison with that of the elastomeric polymer. At least 35% by weight of the polymer mixture is desirably the elastomeric hydrocarbon polymer in order that adequate elasticity and flexibility is retained in the polymer polyblend. While the elastomeric hydrocarbon polymer content of the polyblend can be satisfactorily from about 35% to about 95%, the preferred content is about 45% to 80% by weight of the polymer polyblend. Correspondingly, the preferred content of the modifying ester polymer is from 55% to 20% by weight of the polymer mixture.

Any of the homopolymers and copolymers of esters having a $>C=CH_2$ vinylidene moiety, preferably esters of alpha, beta-unsaturated vinylidene monocarboxylic acids, well recognized in the coating art as weather resistant film-forming materials, can be used as the modifying ester polymer II in combination with the elastomeric hydrocarbon polymer I. Ordinarily these ester polymers can be from 5000 to about 500,000 in molecular weight, preferably solid polymers having a molecular weight up to about 100,000.

The aqueous dispersion of the ester polymer can be prepared by aqueous emulsion polymerization or by post-dispersing the preformed polymer, preferably by emulsion polymerization, the colloidal particle diameter ordinarily being from 0.05 to 5 microns. The aqueous dispersion of the ester polymer ordinarily includes a surfactant in addition to the aqueous dispersed colloidal particles of the polymer for the purpose of stabilizing the dispersion. The concentration of surfactant can be the usual proportion of 0.5% to 10% based on the weight of the ester polymer. The surfactant, preferably water-soluble, can be non-ionic, anionic or cationic. Any ionic surfactant present in the aqueous dispersion of the ester polymer should be non-reactive and compatible with the surfactants present in the latex of the elastomeric hydrocarbon polymer to avoid incompatibility and interaction on mixing in preparing the aqueous dispersion of the polymer polyblend.

While the ester polymer can be a homopolymer such as polyvinyl acetate, polyvinyl propionate, polymethylmethacrylate, polybutyl methacrylate, polyethylacrylate and other homopolymers of esters having the $>C=CH_2$ vinylidene moiety, the ester polymer preferably is a copolymer which can be either a simple binary copolymer, a ternary copolymer, a quadri-copolymer, or even more complex in composition.

These ester copolymers can have polymerizably combined units of isobutylene, such as for example a copolymer of vinyl acetate and isobutylene. However, the $C_4$ hydrocarbon polymer contribution from this ester polymer source should be in addition to the indicated minimum proportion of 35% of the elastomeric hydrocarbon polymer of $C_4$ monoolefin. The sum of the amount of the elastomeric hydrocarbon polymer per se plus the isobutylene contribution of the monovinylidene-unsaturated ester/isobutylene copolymer should not exceed the indicated 95% maximum for the elastomeric hydrocarbon polymer.

Preferred ester copolymers have combined units derived from (A), at least one polymerizable compound having a $>C=CH_2$ vinylidene moiety, which compound when homopolymerized yields a relatively hard polymer having a softening point above 55° C. or a brittle point above 5° C., and combined units derived from (B) at least one ester of an alpha, beta-unsaturated vinylidene monocarboxylic acid which when homopolymerized yields a polymer relatively softer than (A). For rheological purposes, the preferred ester copolymers further have combined units derived from (C) a copolymerizable alpha-beta monoethylenically-unsaturated carboxylic acid, preferably an alpha, beta-unsaturated monovinylidene monocarboxylic acid. Useful (C)-type copolymerizable carboxylic acids preferably have from 3 to 10 carbon atoms per molecule.

Representative useful polymerizable monomers of the indicated category (A) are: methacrylates of the general formula

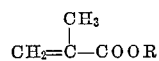

where —R is a $C_1$ to $C_4$ saturated aliphatic hydrocarbon group which can be primary, secondary or tertiary, such as methyl methacrylate, ethyl methacrylate, propyl methacrylate, isopropyl methacrylate, butyl methacrylate, isobutyl methacrylate, secondary and tertiary butyl methacrylates. Glycidyl methacrylate, cyclohexyl methacrylate or acrylate, tertiary amyl methacrylate or acrylate, acrylonitrile, methacrylonitrile, styrene, methyl styrene and vinyl toluene are also useful species of (A).

Representative useful polymerizable monomers of the indicated category (B) are: the acrylates of the general formula $CH_2=CH—COOR'$ where —R' is an alkyl group having up to 18 carbon atoms, such as methyl acrylate, ethyl acrylate, propyl acrylate, isopropyl acrylate, butyl acrylate, isobutyl acrylate, secondary butyl acrylate, amyl acrylate, isoamyl acrylate, hexyl acrylate, 2-ethylbutyl acrylate, octyl acrylate, 2-ethylhexyl acrylate, nonyl acrylate, 3,5,5 trimethylhexyl acrylate, decyl acrylate, dodecyl acrylate, octadecyl acrylate, allyl acrylate and methallyl acrylate; methacrylates of the general formula

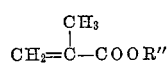

where —R" is a primary or secondary $C_5$ to $C_{18}$ aliphatic hydrocarbon group such as n-amyl methacrylate, secondary amyl methacrylate, hexyl methacrylate, 2-ethylbutyl methacrylate, octyl methacrylate, 2-ethylhexyl methacrylate, nonyl methacrylate, decyl methacrylate, dodecyl methacrylate, octadecyl methacrylate; butoxyethyl acrylate, butoxyethyl methacrylate and other alkoxyethyl acrylates and methacrylates having a $C_1$ to $C_4$ alkoxy substituent.

While the aforementioned representative useful species of monomer categories (A) and (B) are preferably esters of either acrylic acid or methacrylic acid, comparable esters of ethacrylic acid, phenylacrylic acid or crotonic acid can be present in combination with these acrylates or methacrylates.

Representative useful species of copolymerizable carboxylic acids of the defined category (C) are: methacrylic acid, acrylic acid, ethacrylic acid, phenyl acrylic acid, crotonic acid, maleic acid, fumaric acid, itaconic acid, citraconic acid, aconitic acid, the dimer of methacrylic acid, and the trimer of methacrylic acid. The partial esters of these dicarboxylic and tricarboxylic acids and a monohydric alcohol having the general formula R'—OH where R'— is as defined above are also useful.

Preferentially, the ester copolymers have polymerizably combined units of at least one monomer of the category (A) and at least one ester monomer of category (B), the proportion of all polymerizably combined ester units in the copolymer being at least 30% by weight. The relative weight proportions of the units of the category (A) and the category (B) can vary widely, preferred proportions being 25% to 75% of (A) and 75% to 25% of (B) based on the total weight of (A) plus (B). These highly useful ester copolymers preferentially are at least ternary in composition in having copolymerized units of monomers of the indicated categories (A), (B) and (C). While the copolymerized units of the carboxylic acid monomers of the indicated category (C) can be present in amounts up to 10% by weight of the ester copolymer, about 5% is a preferred maximum and about 0.5% to 3% is particularly preferred. An amount as small as 0.3% is effective in altering the rheological properties of the aqueous dispersed ester copolymer.

While the units of the monomers of the indicated category (C) are shown as mono-, di- and tricarboxylic acids, these units can also be present in the copolymer as a carboxylate of an alkali metal, such as potassium and sodium, of ammonium hydroxide, or of a volatile alkyl amine. Hence, the ester copolymer can have units of the category (C) which are either in the unreacted carboxylic state, in the partially reacted acidic carboxylate state, or in the fully neutralized carboxylate state.

Typical particularly useful solid ester copolymers having units of the indicated categories (A), (B) and (C) are shown in the following table.

TABLE I

| Copolymer: | (A) | | (B) | | (C) | |
|---|---|---|---|---|---|---|
| 1 | Acrylonitrile | 35 | Butyl Acrylate | 60 | Methacrylic Acid | 5 |
| 2 | do | 49 | Ethyl Acrylate | 49 | do | 2 |
| 3 | do | 63 | Butyl Acrylate | 32 | do | 5 |
| 4 | {Acrylonitrile | 63 | do | 27 | do | 5 |
|   | Glycidyl Methacrylate | 5 | | | | |
| 5 | {Acrylonitrile | 57.5 | Ethyl Acrylate | 37.5 | Crotonic Acid | 2 |
|   | Glycidyl Methacrylate | 3 | | | | |
| 6 | {Acrylonitrile | 33 | 2-Ethylhexyl Acrylate | 30 | Acrylic Acid | 4 |
|   | Styrene | 33 | | | | |
| 7 | {Acrylonitrile | 10 | Butyl Acrylate | 27 | do | 3 |
|   | Isobutyl Methacrylate | 60 | | | | |
| 8 | Acrylonitrile | 21.5 | do | 76 | Itaconic Acid | 2.5 |
| 9 | Styrene | 56.4 | do | 41 | Methacrylic Acid | 2.6 |
| 10 | Methyl Methacrylate | 30 | Ethyl Acrylate | 69 | do | 1 |
| 11 | do | 32 | do | 64.5 | Ammonium Methacrylate | 3.5 |
| 12 | {Styrene | 52 | Octyl Acrylate | 40 | Methacrylic Acid | 2 |
|    | Acrylonitrile | 6 | | | | |

Many of these aforementioned preferential ester copolymers having a molecular weight from 5000 to 100,000 are commercially available in aqueous dispersion or latex form. For example, "Lecton" acrylic resins supplied by E. I. du Pont de Nemours and Company, Inc. are available in the types corresponding to Copolymers 1 and 3 of Table I. "Rhoplex" AC–33 acrylic resin latex supplied by Rohm and Haas has a polymer composition comparable to Copolymer 10. "Lytron" 680 acrylic resin latex supplied by Monsanto Chemical Company has a polymer composition comparable to the quadri-polymer Copolymer 12.

The polymer art is profuse in the teaching of the preparation of these ester copolymers by suitable emulsion polymerization techniques. Several patents which disclose these suitable emulsion polymerization techniques are:

Maeder U.S. Patent 2,753,318,
Sutton U.S. Patent 2,767,153,
Sanders U.S. Patent 2,787,561,
Sanders U.S. Patent 2,787,603,
Copending application Sanders, Serial No. 578,405, filed April 16, 1956, now U.S. Patent 2,866,763,
McLaughlin et al. U.S. Patent 2,790,736, and
Conn et al. U.S. Patent 2,795,564.

The aqueous dispersion polymer polyblend of the $C_4$ monoolefinic hydrocarbon polymer and the modifying ester polymer can satisfactorily further contain a minor proportion, preferably no more than 20%, of one or more ancillary latices, aqueous dispersions, or aqueous suspensoids of still other organic polymers. Typical of these ancillary dispersions are the coating type latices of butadiene/styrene copolymers and butadiene/acrylonitrile copolymers, aqueous suspensoids of tetrafluoroethylene resin and trifluorochloroethylene resin, aqueous dispersions of polyvinyl fluoride, and aqueous dispersions of organosiloxane polymers. When these ancillary organic polymer dispersions are present in the polyblend, it is because of certain peculiar advantageous functional effects of the respective ancillary polymers other than counteracting the tackiness and softness of the $C_4$ monoolefinic hydrocarbon polymer. The inert fluorine-containing polymer particles dispersed in the polyblend function more as a dispersed pigment inasmuch as the house paint composition is not subjected to high temperature conditions necessary for coalescence or fusion of such inert particles. Because of the unsaturation of the indicated butadiene copolymers which nullifies some of the desirable advantages contributed by the substantially saturated polymer of the $C_4$ monoolefinic hydrocarbon, it is desirable that the content of the ancillary diene hydrocarbon copolymers does not exceed 10% of the polymer polyblend.

Pigmentation, as well as polyblending with the ester polymer, is helpful toward counteracting softness and tackiness of the polymers of the $C_4$ monoolefinic hydrocarbons in providing utilization of these polymers in paint formulations. For utility as an exterior house paint it is advantageous that the total pigment constitutes a pigment volume concentration of at least 25%. At significantly lower levels of pigment volume, exterior house paint formulated with the polymer polyblend ordinarily will exhibit residual tackiness sufficient to cause noticeable collection of air-borne dirt on exposure. This collected dirt held by the tacky paint is not removable by ordinary paint cleaning operations. A practical maximum pigmentation for exterior house paints is about 65% pigment volume concentration and usually the pigment volume concentration is from about 30% to about 60%, 35% to 50% being especially preferred. For interior use, the paint formulations can usefully have a pigment volume concentration as low as 5% and in some instances the paint vehicle, unpigmented or pigmented with transparent pigment or extenders, can be satisfactorily used as a clear coating.

Pigment compositions used in exterior house paints usually comprise hiding white pigments, other tints and colors ordinarily being obtained by mixing other colored paint pigments with the white pigments. Any of the inorganic and organic pigments, pigment lakes, insoluble dyes and other durable coloring matter ordinarily used in formulating durable exterior paints, varnishes, enamels and lacquers can be used in pigmenting the invention paint compositions. Typical useful white hiding pigments are: rutile titanium dioxide, anatase titanium dioxide, zinc oxide, leaded zinc oxide, zinc sulfide, lead titanate, antimony oxide, zirconium oxide, white lead, basic lead silicate, lithopone, titanated lithopone, titanium-barium pigment, titanium-calcium pigment and titanium-magnesium pigment. The titanium dioxide pigments ordinarily are preferred.

While the indicated pigmentation can be solely of hiding prime pigments, it is economically impractical to use solely prime pigments at the indicated high pigment volume concentrations. As is ordinary practice in paint formulation, the total pigment usually consists of hiding prime pigments extended with well known pigment extenders such as calcium carbonate, gilders whiting, talc, barytes, magnesium silicates, aluminum silicates, diatomaceous earth, china clay, asbestine, silica and mica. The relative proportions of the prime white pigment and the pigment extender in the pigment mixture may be varied widely, but usually the hiding prime pigment is present at a pigment volume concentration which provides the desired paint covering power or hiding and the extender pigment is present in an amount which provides the paint with the desired total pigment volume concentration. Prime pigments and extender pigments range widely in density, but ordinarily white house paints and light tints thereof have a pigment composition whereof the extender pigment is present in the weight proportion of .4 to 4 parts per part of hiding prime pigment.

Pigments can be dispersed in the aqueous paint vehicle by any of the well known techniques of pigment dispersion in paint formulation, such as roller milling, ball or pebble grinding, sand grinding as described in Hochberg U.S. Patent 2,581,414, paddle-mixer dispersion techniques, W. and P. mixing and other pigment paste techniques. The pigments can be dispersed in either of the aqueous dispersion polymer compositions prior to combining the respective compositions as the aqueous dispersion polymer polyblend, they can be dispersed in the preformed polyblend vehicle, or the pigments can be wet and dispersed in a separate aqueous slurry in the absence of the pertinent polymer components of the polyblend and then combined with the aqueous dispersion polymer polyblend by simple mixing. The order of combining the pigments is not significantly critical.

The pigment composition is preferably dispersed in the presence of a water-soluble and swellable colloidal bodying agent and an auxiliary surfactant in addition to the surfactants present in the respective latices to stabilize the polymer dispersions. The auxiliary surfactant for dispersing the pigment composition can be non-ionic, anionic, or cationic, preferably of the water-soluble type. The selection of this dispersing surfactant is judicious to provide compatibility and non-reactivity with the dispersion stabilizing surfactants of the respective aqueous dispersions of the polyblend paint vehicle. The surfactant for dispersing the pigment composition may be the same or different from the stabilizing surfactants of the polyblend. Ordinarily a concentration of up to 2% of the auxiliary pigment-dispersing surfactant based on the weight of the pigment composition is adequate, the preferred concentration being 0.1% to 1% on the indicated basis. It is preferred that the total amount of pigment dispersing surfactant and the stabilizing surfactants of the respective latices does not exceed 10% based on the total weight of the dispersed elastomeric hydrocarbon polymer I and the ester polymer II.

The rheological characteristics of the paint can be varied to suit the application needs. As indicated, the presence of combined carboxylic units of the described category (C) in the ester copolymer are helpful in altering the rheological characteristics, particularly when carboxylic substituents are reacted with ammonium hydroxide to form the ammonium carboxylate of the ester copolymer. The aqueous dispersion paint ordinarily is adjusted to an alkaline state of 7.5 to 10 pH with ammonium hydroxide. When the ester polymer does not contain combined carboxylic or carboxylate units; polyacrylic acid, polymethacrylic acid, water-soluble or water-swellable copolymers of acrylic acid or methacrylic acid, or water-soluble and water-swellable carboxylates of copolymers of these acids can be advantageously present in the composition to modify the rheological characteristics. These materials can be ancillary to the ester copolymers having the carboxylic (C) type units. Water-soluble cellulose derivatives such as methyl cellulose, carboxymethyl cellulose or hydroxyethyl cellulose, especially methyl cellulose, can also be used for bodying purpose. These materials are used in their ordinary small effective proportions.

Another desirable ancillary component which is preferentially present in the aqueous dispersion paint composition is a volatile water-soluble organic anti-freeze agent to provide the aqueous paint with freeze-thaw stability. Ethylene glycol is especially useful for this purpose at concentrations up to about 5% by weight of the total composition. Other glycols and polyglycols can be used for this purpose.

Aqueous dispersion paint composition containing surfactants ordinarily foam unless selection of the dispersants is specifically directed to the inherently non-foaming species. Anti-foam agents are ordinarily included in the aqueous paint formulation to minimize foaming. High boiling alcohols, polyglycols, silicone liquids and other anti-foam agents well known to the coating art can be included in the composition as an ancillary component.

As with conventional paints and enamels formulated from drying oils and from alkyd resins, the paints coalesced from the invention composition may exhibit fungus attack and therefore it is further desirable to include a preservative or fungicidal agent in the paint. Any of the well known preservative agents used in paint formulations can be used in their usual small effective proportions. Phenyl mercury oleate and other phenyl mercurial fungicides are especially useful at active concentrations from .05 to .3% by weight of the composition.

The paint compositions of this invention ordinarily are adequately flexible that external plasticization of the polymer polyblend is unnecessary. However, in polyblends in which the ester polymer is in preponderance over the elastomeric hydrocarbon polymer where it may be desirable to further plasticize the polyblend without manipulation by internal plasticization of the ester polymer, ancillary plasticizer can be included in the composition in a minor proportion up to 10% by weight of the polyblend, preferably no more than 5%. Presence of this small proportion of ancillary plasticizer sometimes is advantageous toward improving the freeze-thaw characteristics of the aqueous product when used in combination with the water-soluble glycol-type anti-freeze agent. Non-volatile ester plasticizers, for example, the phosphates, such as tricresyl phosphate, and the phthalates, such as dibutyl phthalate, or the "Santicizer" plasticizers can be used.

While the total non-volatile content of the aqueous dispersion paint composition, ordinarily designated as the solids content, can vary widely, it is desirable that the non-volatile content be at least 30% by weight in order that a practical amount of paint per coat is applied. The aqueous paint can be satisfactorily formulated at a non-volatile content as great as 70%, but at this concentration thinning with water is ordinarily necessary for satisfactory application. The preferred non-volatile content is from about 40% to 60% by weight.

The viscosity of the aqueous dispersion paint composition also can be varied widely. A Stormer viscosity of about 70 to 100 K.U. at 25° C. is a desirable ready-to-apply brush consistency. This is not a critical characteristic as the paint can be further modified satisfactorily with thixotropy controlling agents to provide the composition with non-drip characteristics with adequate brush-out characteristics.

The following aqueous paint formulation is illustrative of the generally preferred concept of the invention which is generic to the more specific examples.

| | Percent by wt. |
|---|---|
| (a) Colloidal aqueous dispersed organic polymer polyblend | 10 to 25 |
| (b) Pigment composition | 20 to 55 |
| (c) Stabilizing and dispersing surfactants | 0.1 to 2.5 |
| (d) Bodying hydrophilic colloid—methyl cellulose | 0.05 to 0.5 |
| (e) Anti-freeze agent—ethylene glycol | 1 to 5 |
| (f) Anti-foam agent—polypropylene glycol | 0.2 to 2 |
| (g) Water-soluble polymeric organic rheology controlling agent | 0 to 3 |
| (h) Ammonium hydroxide—to pH value 7.5 to 10. | |
| (i) Fungicidal preservative—phenyl mercurial salt | 0.05 to 0.3 |
| (j) Water | Balance |

The polymer polyblend (a) consists essentially of aqueous dispersed particles of the elastomeric hydrocarbon polymer I and aqueous dispersed colloidal particles of the ester polymer II in the preferred proportions of 80% to 45% of I and 20% to 55% of II based on the weight of (a), the ester polymer preferably being a copolymer having at least 30% by weight of combined units derived from one or more alpha-beta monovinylidene unsaturated monocarboxylic acid esters. The pigment composition (b) essentially comprises a mixture of hiding white prime pigment, preferably titanium dioxide, and white extender pigment, preferably in the proportions of about 0.4 to 4 parts of the extender per part of the hiding prime pigment, the pigment volume concentration of (b) being from 25% to 65%. The total of the dispersing and stabilizing surfactants (c) is an amount no greater than 10% based on the weight of (a). The rheology controlling water-soluble organic polymer (g) having combined units of an alpha-beta monovinylidene monocarboxylic acid can be present in the acidic form or as the water-soluble carboxylate salt, such as the ammonium salt.

The following are more specific illustrative examples.

*Example 1*

| First portion: | Percent by wt. |
|---|---|
| Hiding prime pigment—titanium dioxide | 19.50 |
| Pigment extender—calcium carbonate | 12.50 |
| Bodying hydrophilic colloid—methyl cellulose—4000 cps | 0.12 |
| Potassium tripolyphosphate—$K_5P_3O_{10}$ | 0.10 |
| Second portion: | |
| Anti-foam agent—"Nopco" 1497V 60% active | 0.28 |
| Anti-freeze—ethylene glycol | 1.60 |
| Ammonium hydroxide—28% $NH_3$ | 0.43 |
| Rheology controlling agent "Acrysol" A-3—25% aqueous solution | 0.60 |
| Anti-foam polypropylene glycol, mol wt. 1200 | 0.40 |
| Pigment dispersing surfactant "Tamol" 731—25% in water | 0.20 |
| Phenyl mercury oleate—10% in mineral spirits | 1.80 |
| Water | 19.17 |
| Third portion: | |
| Butyl rubber aqueous dispersion—45% polymer content | 21.0 |
| Ester polymer aqueous dispersion—45% polymer content—Copolymer 10—Table 1 | 21.0 |
| Rheology controlling agent "Acrysol" ASE-60—28% aqueous solution | 1.30 |
| | 100.00 |

In preparing the above compositions, the ingredients of the first portion were dry-blended until uniform. Then the liquid composition of the second portion was added to the first portion to form a pigment paste which was dispersed by one pass on a three roll dispersion mill. The components of the third portion were mixed with the pigment dispersion product of the combined first and second portions until the product was uniform.

In the above composition the ingredients are more specifically identified as follows:

Hiding prime pigment—rutile titanium dioxide.
Pigment extender—an equal weight mixture of gilder's whiting and "Atomite" calcium carbonate.
Methyl cellulose, the bodying hydrophilic colloid, is "Methocel" Type HG–4000 having a viscosity of 3000 to 5000 centipoises for a 2% aqueous solution at 20° C.
Anti-foam agent—"Nopco" 1497V Defoamer is a 60% solids anionic sulfated saturated fatty acids containing about 8% free fatty acid.
Rheology controlling agent "Acrysol" A–3 is a 25% aqueous solution of low molecular weight water-soluble polyacrylic acid.
Rheology controlling agent "Acrysol" ASE–60 is a 28% aqueous solution of a water-soluble carboxylic ternary copolymer of methyl methacrylate, ethyl acrylate and acrylic acid, the acid content being about 35% based on the weight of the copolymer.
The pigment dispersing surfactant is "Tamol"–731, sodium carboxylate of a diisobutylene/maleic acid copolymer.
The butyl rubber dispersion is 45% content of isobutylene/isoprene copolymer, having unsaturation corresponding to about 1.7 mol percent of isoprene and a Mooney viscosity about 72, dispersed in water in the presence of 6% of stabilizing surfactant based on the weight of the butyl rubber. The surfactant is t-octyl-phenoxy-polyethanoxyethanol having about 3 ethanoxy groups per molecule. The colloidal particles of dispersed butyl rubber were of a particle diameter in the range of about .5 to 3 microns, the average particle diameter being about 1.7 microns.

This aqueous dispersion of the butyl rubber was prepared by the general process of post-dispersion described above. About 1% by weight of anti-foam agent based on the butyl rubber was added to aqueous dispersion during the solvent-stripping and concentrating stage of the preparation. Any of the well known defoamers for hydrocarbon compositions, such as the liquid polymethyl siloxanes, high boiling alcohols and polyglycols can be used for the purpose of minimizing the foam.

"Enjay" Butyl Rubber Latex MD–600–34 34% butyl rubber content or MD–600–55 55% butyl rubber content, can be equivalently substituted for the indicated butyl rubber dispersion in an amount which provides the same weight of butyl rubber, the water content being adjusted to compensate for differences in polymer content of the latex.

The ester polymer aqueous dispersion is the ternary copolymer 10 shown in Table 1 at 45% polymer content in water prepared by aqueous emulsion polymerization in the presence of about 5% based on the weight of the ester polymer of t-octyl-phenoxy-polyethanoxyethanol having about 20 ethanoxy groups per molecule. The colloidal particles of the dispersed ester polymer were in the range of 0.25 to 2.5 microns diameter, the average diameter being about 1 micron.

"Rhoplex" AC–33 acrylic resin latex having a polymer content of 46% by weight can be equivalently substituted for the indicated ester polymer aqueous dispersion in a weight which provides the same weight of the ester polymer.

If suitable grinding consistency of the combined first and second portions requires the presence of additional water, a portion of either or both of the aqueous polymer dispersions of the third portion can be included in the combined first and second portions during the pigment dispersion operation. Conversely, a part of the water can be omitted from the second portion and added with the third portion if desired to increase the grinding consistency.

The resulting paint composition has a non-volatile content of about 50.9% by weight or about 40% by volume. The pigment content is about 32.0% by weight, the pigment volume concentration is about 30%.

The aqueous paint composition is characterized by a weight per gallon of about 10.78 pounds and a Stormer viscosity of 84 K.U. (Krebs units).

*Example 2*

| First portion: | Percent by weight |
|---|---|
| Hiding prime pigment—titanium dioxide | 18.50 |
| Pigment extender—magnesium silicate | 14.00 |
| Bodying hydrophilic colloid—methyl cellulose—4000 cps | 0.12 |
| Potassium tripolyphosphate—$K_5P_3O_{10}$ | 0.06 |
| Second portion: | |
| Anti-foam agent—"Nopco" 1497V—60% active | 0.16 |
| Anti-freeze—ethylene glycol | 1.60 |
| Ammonium hydroxide—28% $NH_3$ | 0.13 |
| Fungicide—phenyl mercury oleate—10% in mineral spirits | 0.18 |
| Pigment dispersing surfactant—"Tamol" 731—25% in water | 0.37 |
| Water | 26.50 |
| Third portion: | |
| Butyl rubber latex—"Enjay" MD–600–55—55% polymer content | 17.50 |
| Ester polymer "Lytron" 680—acrylic resin dispersion—47% polymer content | 20.50 |
| Rheology controlling agent—"Acrysol" ASE–60—28% | 0.38 |
| | 100.00 |

This paint composition was prepared by the same procedure as described for Example 1. The ingredients of this composition were identical with those of Example 1 with the following exceptions: magnesium silicate is substituted for calcium carbonate as the pigment extender, butyl rubber latex "Enjay" MD–600–55 is substituted for the indicated post-dispersed butyl rubber, and "Lytron" 680 acrylic resin dispersion, a quadri-copolymer, is substituted for the indicated aqueous dispersion of the ternary acrylic copolymer. Copolymer 12 of Table 1 can be substituted on an equal weight basis for the "Lytron" 680. The paint composition has a 9.62% content by weight of the elastomeric hydrocarbon polymer and an equal weight of the ester quadri-copolymer. The total pigment content is 32.5% by weight and the pigment volume concentration is about 30%. The total solids volume is about 40% of the paint composition. The weight per gallon of the paint is about 10.83 pounds.

*Example 3*

| First portion: | Percent by weight |
|---|---|
| Hiding prime pigment—titanium dioxide | 17.80 |
| Extender pigment—calcium carbonate | 23.40 |
| Bodying hydrophilic colloid—methyl cellulose—4000 cps | 0.11 |
| Potassium tripolyphosphate—$K_5P_3O_{10}$ | 0.10 |
| Second portion: | |
| Anti-foam agent—"Nopco" 1497V—60% active | 0.26 |
| Anti-freeze—ethylene glycol | 1.50 |
| Ammonium hydroxide—28% $NH_3$ | 0.50 |
| Rheology controlling agent—"Acrysol" A–3—25% | 0.63 |
| Anti-foam polypropylene glycol—1200 mol. wt. | 0.35 |
| Pigment dispersing surfactant — "Tamol" 731—25% in water | 0.17 |
| Phenyl mercury oleate—10% in mineral spirits | 1.73 |

|  | Parts by weight |
|---|---|
| Water | 26.15 |
| Third portion: | |
| Butyl rubber latex—"Enjay" MD-600-55—55% polymer content | 18.50 |
| Ester copolymer aqueous dispersion—35% polymer content (Copolymer 1) | 7.60 |
| Rheology controlling agent—Acrysol ASE-60—28% | 1.20 |
| | 100.00 |

This paint composition was prepared by the same general procedure as described in Example 1. The ingredients are the same as those described in Examples 1 and 2 with the following exception: The aqueous dispersion ester copolymer corresponds to Copolymer 1, shown in Table 1 prepared by aqueous emulsion polymerization in the presence .5% of sodium lauryl sulfate based on the weight of the copolymer as the stabilizing surfactant essentially following the procedure outlined in Example 4 of co-pending application Sanders Serial No. 578,405, filed April 16, 1956, now U.S. Patent 2,866,763. This dispersion contains the copolymer reacted with an amount of ammonium hydroxide to provide the dispersion with a pH of about 7.5. The average particle size of the copolymer is about 0.25 micron.

This aqueous paint composition has a content of about 10.18% of butyl rubber, 2.66% of the indicated ternary ester copolymer and 41.2% of total pigment by weight. The solids volume of the paint is 40% and the pigment volume concentration is about 45%. The weight per gallon of this paint is about 11.54 pounds and the Stormer viscosity is about 83 K.U. (Krebs units).

*Example 4*

|  | Percent by wt. |
|---|---|
| First portion: Pigment mix composition (combined first and second portions of Example 3) | 72.7 |
| Second portion: | |
| Butyl rubber latex—"Enjay" MD-600-55—55% polymer content | 11.7 |
| Acrylic resin dispersion—"Rhoplex" AC-33—46% polymeric content | 7.0 |
| Acrylic resin dispersion—"Lytron"—47% polymeric content | 6.8 |
| Rheology controlling agent — "Acrysol" ASE-60—28% | 1.20 |
| Water | 0.6 |
| | 100.0 |

The pigment mix composition, corresponding to the combined first and second portions of the composition of Example 3, was thoroughly mixed with the indicated second portion and then the entire composition was ground with 20 to 30 mesh Ottawa sand as described in Hochberg U.S. Patent 2,581,414. The resulting aqueous paint has a content of about 6.42% butyl rubber, 3.21% of the ternary copolymer of (A) methyl methacrylate 30 parts, (B) ethyl acrylate 69 parts and (C) methacrylic acid 1 part, and 3.21% of the quadri-copolymer of (A) styrene 52 parts and acrylonitrile 6 parts, (B) octyl acrylate 40 parts, and (C) methacrylic acid 2 parts. The pigment content is 41.2% by weight and the pigment volume concentration is about 45%.

*Example 5*

|  | Percent by wt. |
|---|---|
| First portion: | |
| Pigment mix composition | 56.8 |
| Butyl rubber latex—"Enjay" MD-600-34—34% polymer content | 22.7 |
| Second portion: Vinyl acetate/isobutylene copolymer aqueous dispersion—25% polymer content | 20.5 |
| | 100.0 |

The pigment mix composition corresponds with the combined first and second portions of the composition of Example 3 with the exception that 15.9% of water is omitted therefrom to compensate for the higher water content of the respective polymer latices of the polyblend. The butyl rubber latex MD-600-34 is identical with MD-600-55 except that the polymer content is 34% by weight.

The vinyl acetate/isobutylene copolymer was prepared from a mixture of 80% vinyl acetate and 20% isobutylene by weight by aqueous emulsion polymerization in an autoclave having agitation means. The polymerization was at 75° C. to 80° C. under autogeneous pressure in the presence of 1% of sodium lauryl sulfate, as surfactant, 1.33% of sodium meta bisulfite and 0.5% of ammonium persulfate as the redox catalyst, the percentages being based on the weight of the monomer charge. Water constituted about 70% of the polymerization charge. The resulting polymerization product having ester copolymer colloidal particles of about .5 micron average diameter was diluted with water to 25% polymer content.

The paint was prepared by uniformly mixing the ingredients of the first portion and subjecting this mixture to sand-grinding to disperse the pigments. The dispersed first portion was mixed with the second portion until uniform.

The pigment content of the resulting aqueous paint is the same as that of Examples 3 and 4. The polymer content of the paint is about 7.72% butyl rubber and 5.12% by weight of the vinyl acetate/isobutylene copolymer.

*Example 6*

|  | Percent by wt. |
|---|---|
| First portion: | |
| Pigment mix composition | 64.8 |
| Polyvinylacetate emulsion — 44% polymer content | 8.8 |
| Second portion: Butyl rubber latex—"Enjay" MD-600-34—34% polymer content | 26.4 |
| | 100.0 |

The pigment mix composition corresponds with that of the combined first and second portions of the composition of Example 3 with the exception that 7.9% of water is omitted therefrom to compensate for the greater water content of the respective aqueous polymer dispersions of the polyblend.

The polyvinylacetate emulsion was prepared by aqueous emulsion polymerization of vinyl acetate at 65° C. to 75° C. by ordinary vinyl polymerization techniques in the presence of 1% of sodium lauryl sulfate as surfactant, sodium phosphate buffer 0.4%, ammonium persulfate and 0.05% of benzoyl peroxide as the catalyst, the indicated percentages being based on the weight of the vinyl acetate, the monomer charge in water being sufficient to provide the resulting aqueous emulsion with a dispersed polymer content of 44%. The resulting dispersed polymer had an average particle diameter of about 0.25 micron.

The ingredients of the first portion were uniformly mixed and subjected to sand-grinding to disperse the pigment. The resulting first portion dispersion product was uniformly mixed with the second portion to complete the paint.

The paint has the same pigment content as the product of Examples 3, 4 and 5. The polymer content of the paint is 8.98% butyl rubber and 3.87% by weight of polyvinyl acetate.

*Example 7*

|  | Percent by wt. |
|---|---|
| First portion: | |
| Hiding prime pigment—titanium dioxide | 17.80 |
| Extender pigment—magnesium silicate | 24.40 |
| Bodying hydrophilic colloid—methyl cellulose—4000 cps | 0.13 |

| | Parts by weight |
|---|---|
| Potassium tripolyphosphate—$K_5P_3O_{10}$ | 0.10 |
| Ethylene glycol | 1.50 |
| Polypropylene glycol—mol wt. 1200 | 0.70 |
| Phenyl mercury oleate—10% in mineral spirits | 1.70 |
| Water | 12.25 |
| Second portion: | |
| Water | 7.60 |
| Ammonium hydroxide—28% $NH_3$ | 0.22 |
| Butyl rubber latex—"Enjay" MD–600–55—55% polymer content | 13.70 |
| Acrylic resin dispersion—"Rhoplex" AC–33—46% polymer content | 19.90 |
| | 100.00 |

The ingredients of the above composition are the same as those described for the preceding examples.

The paint was prepared by mixing the ingredients of the first portion to prepare a substantially uniform mixture and the pigment was dispersed by one pass of this mixture on a three roll paint mill. The resulting dispersion was mixed with the premixed ingredients of the second portion until uniform to complete the paint.

This aqueous paint composition has a total non-volatile content of about 58.9% by weight, the pigment content being 42.2% and the polymer content being 7.53% of butyl rubber and 9.16% of the ternary acrylic ester copolymer. The solids volume concentration of the paint is about 45% and the pigment volume concentration is about 40%. The paint has a weight per gallon of 11.83 pounds and the Stormer viscosity about 80 K.U. at 25° C.

The aqueous dispersion paint compositions of these several specific examples were applied by brush without further thinning to the following test substrates:

(1) Western red cedar siding
(2) Southern yellow pine boards
(3) Primed western red cedar siding
   (a) Ordinary drying oil primer
   (b) Linseed oil alkyd resin primer
(4) Primed yellow pine boards
   (a) Ordinary drying oil primer
   (b) Linseed oil alkyd resin primer
(5) Weathered house siding having an aged paint film Two coats of paint in an amount sufficient to provide 1.5 mils dry coating thickness were applied in each instance. A drying time of one hour was allowed between coats. The primed wood substrates were prepared by applying one coat of either pigmented drying oil primer or pigmented alkyd resin primer in an amount sufficient to provide 2.5 mils of dry film thickness. The alkyd resin primer was comprised essentially of a long oil length linseed oil modified glyceryl phthalate alkyd resin pigmented to about 20% pigment volume concentration with an equal volume mixture of titanium dioxide and aluminum silicate extender pigment. The pigment volume concentration of the respective primers is significantly lower than that of the superimposed aqueous dispersion paint.

The weathered siding was obtained as salvage lumber from house wrecking operations. This siding had a plurality of coats of aged linseed oil paint on the weathered side and, used as test substrates, the weathered paint was topcoated with the invention aqueous paints without preconditioning the weathered paint surface in any manner.

Triplicate series of the respective test panels were exposed south at 45° in Delaware, south at 45° in Florida and north vertical in Florida. These exposure test panels were periodically examined to determine the weathering characteristics and aging properties.

The test panels exposed in Florida showed excellent weathering of the paint. The paint did not exhibit tackiness or softness when exposed to the hot summer temperature of Florida climate. The test panels exposed in Delaware showed excellent weathering of the paint. The paint remained adequately flexible and did not crack during exposure to subfreezing temperature of the northern winter climate. The paint exhibited freedom of significant dirt collection of air-borne industrial dust, this being indicative of absence of tackiness and softness on exposure to the summer temperatures.

Field tests conducted with the products of Examples 1, 2 and 3 on both new wood and previously painted wood from houses confirmed the excellent results obtained with the test panels and showed the adequacy of these aqueous dispersion paint compositions for utility as an exterior house paint. While recoating in one hour is operable, the second coat was applied in the field test after the first coat had an opportunity to dry from several hours to several days. Conventional aqueous emulsion paints formulated with polyvinyl acetate emulsion and butadiene/styrene copolymer latex and comparably pigmented for utility as an exterior house paint, used as comparative products applied and exposed in the same manner, were found to be insufficiently flexible to resist cracking during northern winter exposure. These comparative paints additionally plasticized to resist cracking in northern climates were too soft and tacky for satisfactory exterior house paint use in the warm southern climates.

While utility of the invention paints is directed primarily as an exterior house paint for wood, it can be used with equal satisfaction on masonry such as cement, brick, cinder block, plaster, stucco, stone and asbestos shingle.

For brush application, the viscosity of the aqueous paint is desirably in the range of 70 to 100 Stormer Krebs units at 25° C., a range of 75 to 85 being particularly preferred. Although brush application is the most common method of applying exterior house paints, the invention products can also be applied by other ordinary methods, such as roller coating and spraying, the products being thinned with water to reduce the package-consistency to the desired application viscosity for these means of application.

Retained storage samples of the invention products showed that they are package-stable in containers ordinarily used for packaging aqueous paint products and that these paints ordinarily adequately resist several freeze-thaw cycles of alternating storage at 0° F. and 77° F.

While only a few examples of aqueous paint formulations are described above to illustrate the invention, it will be apparent that many different modifications and equivalents may be made without departing from the spirit and scope of the described invention and, therefore, the invention is intended not to be limited except as defined by the appended claims.

I claim:
1. An aqueous dispersion paint composition having utility as a durable, weather-resistant exterior house paint, said composition comprising a dispersed paint pigment composition comprising at least one hiding prime pigment and an aqueous dispersion polymer polyblend paint vehicle comprising dispersed colloidal particles of a substantially saturated elastomeric hydrocarbon polymer I of a monomer composition including at least 95 mol percent of at least one $C_4$ monoolefinic hydrocarbon, dispersed colloidal particles of at least one organic ester polymer II comprising essentially polymerizably combined units of at least one polymerizable monomeric ester having a $>C=CH_2$ vinylidene moiety, water and at least one surfactant in an effective dispersion-stabilizing amount up to 10% based on the weight of the dispersed colloidal particles of said polymers I and II, said elastomeric hydrocarbon polymer I having a degree of ethylenic unsaturation no greater than 2.5 mol percent expressed as isoprene and being present in an amount from 95% to 35% by weight of the total weight of I and II, said pigment being present in an amount up to 65% pigment volume concentration.

2. The paint product of claim 1 in which said elastomeric hydrocarbon polymer I is a copolymer of isobutylene and at least one $C_4$ to $C_8$ diolefinic hydrocarbon, said copolymer having a degree of residual ethylenic unsaturation equivalent to 0.25 to 1.5 mol percent expressed as isoprene.

3. The paint product of claim 2 wherein said diolefinic hydrocarbon component of said hydrocarbon copolymer consists essentially of isoprene.

4. The paint product of claim 1 wherein said ester polymer II is an organic polymer comprising essentially polymerizably combined units derived from at least one polymerizable ester of an alpha-beta-unsaturated vinylidene monocarboxylic acid.

5. The paint product of claim 4 wherein said ester polymer II is a copolymer comprising essentially of combined units of (A) representing at least one copolymerizable monomer having a $>C=CH_2$ vinylidene moiety, which compound when homopolymerized yields a relatively hard polymer having a softening point above 55° C. and combined units of (B) representing at least one copolymerizable monomeric ester of an alpha, beta-unsaturated vinylidene monocarboxylic acid, which ester when homopolymerized yields a polymer relatively softer than said homopolymer of said monomer of category (A), the relative proportion of said copolymerizable monomers being about 25% to 75% of said (A) monomers and 75% to 25% of said (B) monomers based on the total weight of (A) and (B).

6. The paint product of claim 5 wherein said ester copolymer is at least ternary in composition, further having polymerizably combined therewith units of (C), representing at least one copolymerizable alpha, beta ethylenically unsaturated carboxylic acid in an amount from .3% to 10% based on the weight of the copolymer.

7. The paint product of claim 6 wherein said copolymerizable carboxylic acid (C) is an alpha-beta-unsaturated vinylidene monocarboxylic acid present in an amount from .3% to 5%.

8. The paint product of claim 1 wherein said paint pigment composition comprises a mixture of at least one hiding white prime pigment and at least one white extender pigment, said pigment composition being present at a pigment volume concentration of 25% to 65%.

9. The paint product of claim 1 wherein said dispersed elastomeric hydrocarbon polymer I is butyl rubber in an amount from 80% to 45%, said dispersed ester polymer II, present in an amount from 20% to 55% based on the total weight of I and II, is at least ternary in composition consisting essentially of combined units of (A) representing at least one copolymerizable compound having a $>C=CH_2$ vinylidene moiety, which compound when homopolymerized yields a relatively hard polymer having a softening point above 55° C., combined units of (B) representing at least one copolymerizable ester of an alpha, beta-unsaturated vinylidene monocarboxylic acid, which ester when homopolymerized yields a polymer relatively softer than the hard homopolymer of said category (A) compound, and combined units of (C) representing at least one alpha, beta-unsaturated vinylidene monocarboxylic acid in an amount from 0.3% to 5% based on the weight of the copolymer, the relative proportions of said (A) units and said (B) units being 25% to 75% and 75% to 25% respectively based on the weight of (A) and (B), and said paint pigment composition comprises a mixture of titanium dioxide and at least one white extender pigment and is present at a pigment volume concentration of 30% to 60%.

10. The paint product of claim 9 wherein said ester copolymer is at least ternary in composition consisting essentially of said (A) units derived from at least one polymerizable monomer of the class consisting of acrylonitrile, methacrylonitrile, styrene, methyl styrene, vinyl toluene, methyl methacrylate, ethyl methacrylate, propyl methacrylate, isopropyl methacrylate, butyl methacrylate, isobutyl methacrylate, secondary butyl methacrylate, tertiary butyl methacrylate, cyclohexyl methacrylate, cyclohexyl acrylate, tertiary amyl methacrylate, tertiary amyl acrylate and glycidyl methacrylate, of said (B) units derived from at least one polymerizable ester monomer of the class consisting of $C_1$ to $C_{18}$ alkyl acrylates, primary and secondary $C_5$ to $C_{18}$ alkyl methacrylates, alkoxyethyl acrylates and alkoxyethyl methacrylates having a $C_1$ to $C_4$ alkoxy substituent, and of said (C) units derived from at least one alpha, beta-unsaturated vinylidene monocarboxylic acid.

11. The aqueous dispersion paint composition of claim 1 having the following approximate composition:

| | Percent by wt. |
|---|---|
| (a) Polymer polyblend of aqueous dispersed colloidal particles in an amount of 80% to 45% of said hydrocarbon polymer I and 20% to 55% of said Ester polymer III based on the weight of (a) | 10–25 |
| (b) Pigment composition comprising hiding white prime pigment and white extender pigment | 20–55 |
| (c) Stabilizing and dispersing surfactants | 0.1–2.5 |
| (d) Bodying hydrophilic colloid—methyl cellulose | 0.05–0.5 |
| (e) Anti-freeze agent—ethylene glycol | 1.–5 |
| (f) Anti-foam agent—polypropylene glycol | 0.2–2 |
| (g) Water-soluble polymeric organic rheology controlling agent | 0–3 |
| (h) Ammonium hydroxide—to pH 7.5 to 10. | |
| (i) Fungicidal preservative | 0.05 to 0.25 |
| (j) Water | Balance | said ester polymer II being further characterized as being a copolymer comprising at least 30% by weight of polymerizably combined ester units derived from at least one alkyl ester of an alpha, beta monovinylidene-unsaturated monocarboxylic acid, said pigment being present in an amount which provides a pigment volume concentration of 25% to 65%, said surfactant (c) being present in an amount no greater than 10% based on the weight of (a), and the total nonvolatile content of the paint composition being no greater than 70% by weight.

12. The paint product of claim 11 wherein said elastomeric hydrocarbon polymer I is a copolymer of isobutylene and isoprene.

13. The paint product of claim 11 wherein said ester polymer II is at least ternary consisting essentially of polymerizably combined units of at least one lower alkyl methacrylate, combined units of at least one alkyl acrylate, and combined units of an alpha-beta monovinylidene-unsaturated monocarboxylic acid in an amount of 0.3% to 5% by weight of the ester polymer II.

14. The paint product of claim 11 wherein said ester polymer is at least ternary in composition consisting essentially of polymerizably combined units of at least one alkyl ester of an alpha-beta monovinylidene-unsaturated monocarboxylic acid, combined units of styrene, and from 0.3% to 5% by weight of combined units of methacrylic acid.

15. The paint product of claim 11 wherein said ester polymer is at least ternary in composition consisting essentially of polymerizably combined units of at least one alkyl ester of an alpha, beta monovinylidene-unsaturated monocarboxylic acid, combined units of acrylonitrile, and from 0.3% to 5% of combined units of an alpha-beta monovinylidene-unsaturated monocarboxylic acid.

16. A wood article having a surface normally exposed to atmospheric weather conditions consisting essentially of a wood substrate and, as a weather-resistant protective finish on said exposed surface thereof, a water-vapor permeable dry coat of paint primer directly on said wood substrate and superimposed on said primer coat at least one water-vapor permeable dry coat of the paint composition of claim 1, said paint primer essentially comprising a drying glyceride oil paint vehicle and a pigment composition comprising a hiding prime pigment and an extender pigment at a pigment volume concentration less than that of the superimposed coat.

17. A wood article having a surface normally exposed to atmospheric weather conditions having a wood substrate and as a durable weather-resistant protective finish on said exposed surface thereof at least one water vapor permeable dry coat of the paint composition of claim 1.

18. The article of claim 17 having a layer of weathered paint on said wood substrate and said weather-resistant water vapor permeable protective finish superimposed on said weathered paint layer.

19. The method of preparing an aqueous dispersion paint composition having utility as a durable, weather-resistant exterior house paint, which method comprises the steps of (a) stably dispersing an elastomeric hydrocarbon polymer I of a monomer composition including at least 95 mol percent of at least one $C_4$ monoolefinic hydrocarbon to a colloidal particle size up to about 5 microns in water in the presence of a stabilizing surfactant in an amount up to 10% based on the weight of said polymer I, (b) mixing said aqueous dispersion resulting from step (a) with an aqueous dispersion of colloidal particles of an organic ester polymer II comprising polymerizably combined units derived from at least one polymerizable monomeric ester having a $>C=CH_2$ vinylidene moiety, said hydrocarbon polymer I in the resulting polymer polyblend being presented in an amount of 95% to 35% based on the total weight of said polymers I and II and being characterized as having residual ethylenic unsaturation up to 2.5 mol percent expressed as isoprene, and (c) dispersingly combining a paint pigment composition comprising a hiding prime pigment with said polymer polyblend resulting from said step (b), the non-volatile content of the paint being up to 70% by weight of the composition including up to 65% pigment volume concentration of total pigment.

20. The method of claim 19 wherein said step (c) essentially comprises preforming a dispersion of said pigment composition in water in the presence of a bodying hydrophilic organic colloid and dispersing surfactants, and mixing this resulting pigment dispersion with the aqueous dispersion organic polymer polyblend resulting from said steps (a) and (b).

21. The method of preparing an aqueous dispersion paint composition having utility as a durable, weather-resistant exterior house paint which method comprises essentially forming an aqueous dispersion organic polymer polyblend paint vehicle by mixing an aqueous latex of stably dispersed colloidal particles of a substantially saturated elastomeric hydrocarbon polymer I of a monomer composition including at least 95 mol percent of isobutylene, said polymer I having residual ethylenic unsaturation in an amount up to 2.5 mol percent expressed as isoprene, with a stable aqueous dispersion of colloidal particles of II, an organic ester polymer comprising polymerizably combined units derived from at least one polymerizable monomeric ester having a $$>C=CH_2$$

vinylidene moiety, in the relative proportions of 95% to 35% of said hydrocarbon polymer I based on the weight of I and II, an effective disppersion-stabilizing amount of surfactant up to 10% based on the weight of said polymers I and II being present in the aqueous dispersion, and dispersingly combining a pigment composition comprising a hiding prime pigment with said polymer polyblend paint vehicle in an amount of 5% to 65% pigment volume concentration, the content of non-volatile components of the aqueous paint composition being up to 70% by weight of the composition.

22. The method of claim 21 wherein the latex of said hydrocarbon polymer I is butyl rubber latex, said ester polymer II is a copolymer, at least binary in composition, having combined units of a lower alkyl methacrylate and combined units of an alkyl acrylate, said pigment composition essentially comprises titanium dioxide and a white extender pigment, the relative proportion of said polymer I being from 80% to 45% based on the weight of said polymers I and II, and the non-volatile content of the paint composition essentially comprises 10% to 25% of said polymer polyblend and 20% to 55% of said pigment composition, based on the total weight of the product, the total non-volatile content being from 30% to 70% by weight.

23. An aqueous dispersion paint vehicle suitable for formulating an exterior house paint composition, said vehicle comprising dispersed colloidal particles of a substantially saturated elastomeric hydrocarbon polymer I of a monomer composition including at least 95 mol percent of at least one $C_4$ monoolefinic hydrocarbon, dispersed colloidal particles of at least one organic ester polymer II comprising essentially polymerizably combined units of at least one polymerizable monomeric ester having a $>C=CH_2$ vinylidene moiety, water and at least one surfactant in an effective dispersion-stabilizing amount up to 10% based on the weight of the dispersed colloidal particles of said polymers I and II, said elastomeric hydrocarbon polymer having a degree of ethylenic unsaturation up to 2.5 mol percent expressed as isoprene and being present in an amount from 95% to 35% by weight of the total weight of said polymers I and II.

24. The paint vehicle composition of claim 23 wherein said elastomeric hydrocarbon polymer I is a copolymer of isobutylene and at least one $C_4$ to $C_8$ diolefinic hydrocarbon and said ester polymer II comprises polymerizably combined units derived from at least one ester of an alpha, beta-unsaturated vinylidene monocarboxylic acid in an amount of at least 30% based on the weight of said ester polymer II, the proportion of said hydrocarbon polymer I being from 80% to 45% based on the weight of said polymers I and II.

References Cited in the file of this patent

UNITED STATES PATENTS

| | | |
|---|---|---|
| 2,341,161 | Partee et al. | Feb. 8, 1944 |
| 2,575,750 | Davison | Nov. 20, 1951 |
| 2,595,797 | Leyonmark et al. | May 6, 1952 |
| 2,650,181 | Stread et al. | Aug. 25, 1953 |
| 2,706,162 | Brown et al. | Apr. 12, 1955 |
| 2,709,689 | Herzog et al. | May 31, 1955 |
| 2,795,564 | Conn et al. | June 11, 1957 |
| 2,820,341 | Miller et al. | Feb. 4, 1958 |
| 2,837,444 | Hahn | June 3, 1958 |
| 2,866,763 | Sanders | Dec. 30, 1958 |
| 2,914,495 | Gordon et al. | Nov. 24, 1959 |